United States Patent [19]

Trittler

[11] Patent Number: 4,564,043
[45] Date of Patent: Jan. 14, 1986

[54] STEPPING VALVE

[75] Inventor: Karl Trittler, Aldingen, Fed. Rep. of Germany

[73] Assignees: J. Hengstler KG., Aldingen; Festo KG, Esslingen, both of Fed. Rep. of Germany

[21] Appl. No.: 627,432

[22] Filed: Jul. 3, 1984

[30] Foreign Application Priority Data

Jul. 20, 1983 [DE] Fed. Rep. of Germany ....... 3326134

[51] Int. Cl.$^4$ .............................................. F15B 18/00
[52] U.S. Cl. ......................... 137/624.18; 137/625.11; 251/160; 251/175; 91/36; 91/40; 91/189 R
[58] Field of Search ........... 137/624.18, 624.2, 625.11; 251/160, 161, 175; 91/36, 40, 189 R, 193

[56] References Cited

U.S. PATENT DOCUMENTS

| 3,034,528 | 5/1962 | Wharff | 137/625.11 X |
| 3,136,335 | 6/1964 | Beech | 137/624.13 |
| 3,642,022 | 2/1972 | Kirby | 137/625.11 X |

Primary Examiner—Alan Cohan
Attorney, Agent, or Firm—Balogh, Osann, Kramer, Dvorak, Genova & Traub

[57] ABSTRACT

This invention relates to a pneumatically actuated stepping valve for an automatic control of inlets and outlets for a pneumatic fluid. Each stepping movement is performed in response to a feedback signal indicating that an operation controlled by the valve has been completed. A distributing disc is provided for selecting consecutive pairs of ports consisting of an inlet port and an outlet port each. The stepping valve consists mainly of plastic parts, which contain numerous bores and passages and can be made at low cost. In accordance with the invention the valve disc cooperates with a sealing piston, which in response to pressure applied to said piston establishes connections to through passages of the valve disc, whereas when the piston is pressure-relieved it will be urged by spring means to disengage the valve disc so that the latter will not be restrained by the piston during its stepping movement.

22 Claims, 6 Drawing Figures

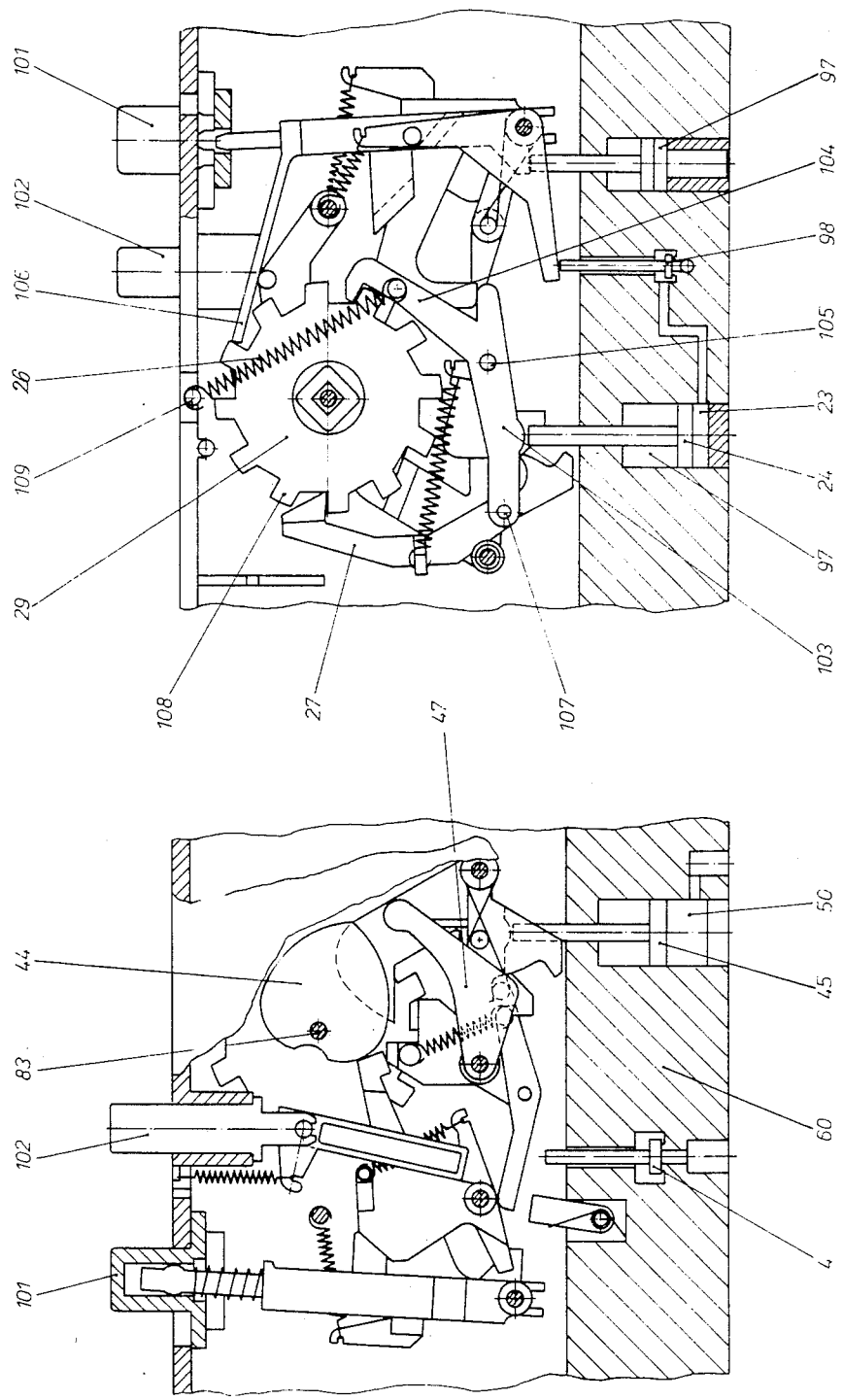

4,564,043

STEPPING VALVE

BACKGROUND OF THE INVENTION

1. Technical Field

This invention relates to a pneumatically operated stepping valve for an automatic control of fluid inlets and fluid outlets in response to feedback signals indicating that an operation controlled by the valve has been completed. An inlet through passage and an associated outlet through passage formed in a valve disc are used to select a fluid inlet and a fluid outlet. Manual control elements are provided in the form of switches and pushbuttons acting on control levers, pawls, valves and pistons so that various modes of operation can be performed by the stepping valve. Indicating means are provided for a digital indication of the position of the valve and for an indication of pressure applied to the inlet line and outlet line.

Stepping selector valves of this kind are used, e.g., for an automatic control of pneumatically controlled operations which are to be performed in a predetermined sequence. In that case the next program step or operation must not be initiated until the preceding operation has been completed and a corresponding feedback signal has been received.

Manual operations are also required for setting up such automatic control systems. Such manual operations may be used to initiate only individual steps or to cause a repetition of certain sequences of steps called for by the program. It is also known to indicate the position of the valve in order to facilitate the setting up of equipment for a programmed sequence of operations.

2. Description of the Prior Art

Laid-open German Application 19 06 944 discloses methods and equipment for an automatic sequential control of consecutive operations to be performed by pneumatically controlled systems. Such control systems are composed of a large number of pneumatically controlled switching and logic elements. Said systems can be designed exactly for each application but are highly expensive. Besides, such stepping control systems are bulky and can be designed only by experts who are familiar with and have experience in the design of such control systems and in the selection of the dimensions of their components.

Laid-open German Application 19 37 697 discloses selecting values for an automatic control of consecutive operations. Said known valves constitute compact units and are highly expensive. They are made of metal elements and their application is restricted by their high costs. Said known valves comprise a valve body and a rotatable valve disc, and the sealing surfaces of said valve body and rotatable valve disc are urged against each other by springs. As a result, large forces are required to shift the rotatable valve disc, and the drive means required for that purpose involve a correspondingly high structural expenditure. Said known valves are also bulky and involve a relatively high expenditure for the functional control of the valve itself.

SUMMARY OF THE INVENTION

It is an object of the invention to provide a stepping valve which can be made of plastic material so that components formed with numerous bores and connecting passages can be manufactured at relatively low cost. Because most parts of the valve consist of precast plastic parts, all line connections which are required can be integrated in the components so that costs are saved and the reliability in operation is increased.

In a pneumatically actuated stepping valve in which a change from one outlet to another is effected in response to the receipt of a feedback signal at an inlet, which stepping valve comprises a valve body having a plurality of inlets and a plurality of outlets for a pneumatic fluid, which inlets and outlets are connected by associated passages to circular series of inlet ports and outlet ports and wherein pairs of ports consisting each of one of said inlet ports and one of said outlet ports are adapted to be successively selected by means of a valve member, which is movable to a plurality of positions, the object set forth hereinbefore is accomplished in that the valve member consists of a rotatable valve disc, a sealing piston is disposed on that side of the valve disc which is opposite to the valve body and is movable into sealing engagement with said valve disc on the side thereof which is remote from said valve body when pressure is applied to said sealing piston, and spring means biasing said sealing piston away from said valve disc are provided so that the sealing piston clears the valve disc when the sealing piston is pressure-relieved. In the stepping valve in accordance with the invention the movable valve member is not restrained during its stepping movement so that much smaller stepping forces are sufficient and the means for intermittently driving the movable valve member require a lower structural expenditure and can be designed for higher stepping speeds and a longer life. In this connection, spring-loaded valve stems are required, which are controlled directly by the valve disc and prevent an excessively large loss of compressed air during the movement of the valve disc.

All connections to the inlet and outlet ports and the air supply port are provided on one side of the valve and consist of enlarged bores, which are adapted to fit plugs, which are carried by a plug body and provided with hose couplings and with means for fixing to carrying bars. Owing to that arrangement the stepping valve with hoses connected to it can be fitted on the plug body or can be removed from it and may be replaced in case of a defect.

BRIEF DESCRIPTION OF THE DRAWING

FIG. 5 is a diagrammatic view showing the lever mechanism with controls and resetting means.

FIG. 6 is a diagrammatic view showing an additional lever mechanism and controls for the stepping movement.

DESCRIPTION OF THE PREFERRED EMBODIMENT

A preferred embodiment of a pneumatically actuated stepping valve in accordance with the invention will now be explained more in detail with reference to the drawings.

Figure 1:
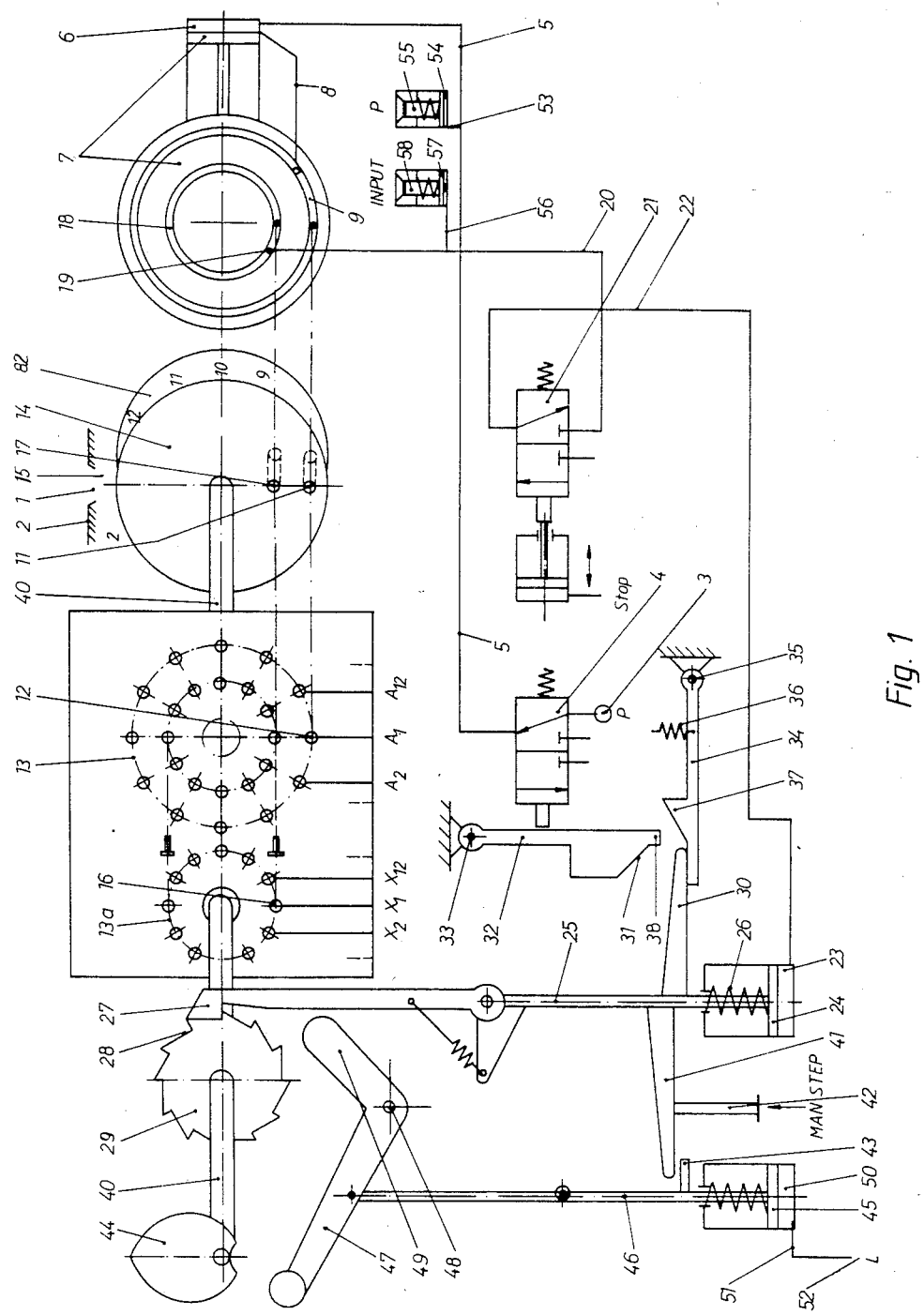
FIG. 1 is a functional circuit diagram showing the entire arrangement including the stepping valve.

The entire function and the air flow paths will be explained more in detail with reference to the circuit diagram shown in FIG. 1. Valve position 1 is indicated in the window 2. Compressed air is supplied to the actuating fluid inlet 3 and from the latter through the open valve 4 and through line 5 to the cylinder chamber 6 provided at one end of the sealing piston 7, which is axially movable and held against rotation. By the compressed air in cylinder chamber 6, the sealing piston 7 is urged into sealing engagement with the valve disc 14.

Figures 2, 3:
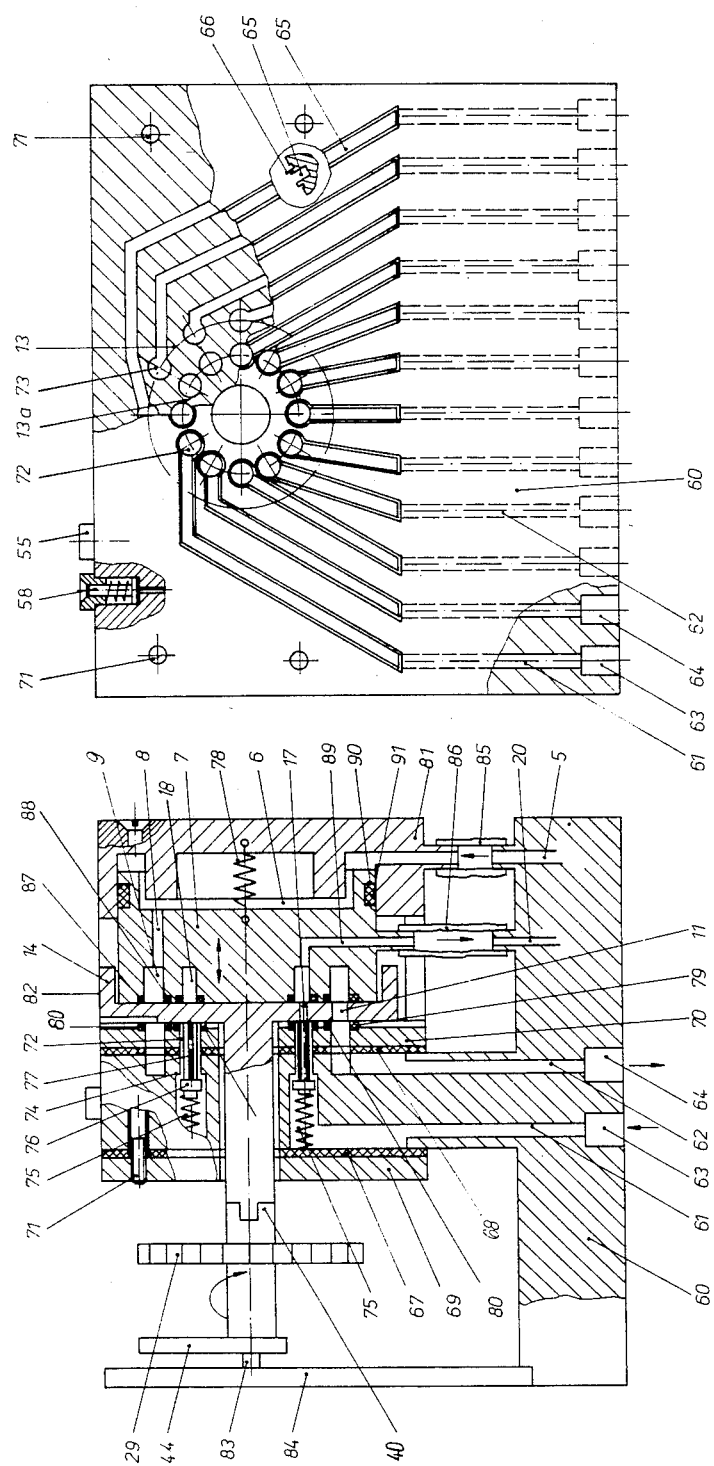
FIG. 2 is a sectional view showing the stepping valve.
FIG. 3 is a top plan view showing the valve body.

Air is also supplied through at least one passage 8 in the sealing piston 7 and through the annular groove 9 therein and through the through passage 11 in the valve disc 14 to one ($A_1$) of the outlet ports 12, which constitute an outer circular series 13 of outlet ports formed in the stationary valve body comprising the core 60 shown in FIG. 2.

When the valve disc 14 is in the illustrated position the through passage 11 of the valve disc 14 registers with the outlet port $A_1$ of the valve body. Each outlet port 12 communicates with a compressed air consumer. The communication of the through passage 11 with the outlet port $A_1$ is indicated by a numeral 1 which appears in the window 2. That numeral 1 is one of the numerals 1 to 12 which are respectively associated with the outlet ports $A_1$ to $A_{12}$ and represent indicia provided on the peripheral surface of the valve disc 14. The supply of compressed air via the outlet port $A_1$ to the consumer continues until the operation to be controlled by said supply has been completed and this is indicated by a pneumatic feedback signal, which is delivered to one ($X_1$) of the inlet ports 16 and results in the next following step of the valve disc 14. The inlet ports 16 constitute an inner circular series 13a of inlet ports formed in the valve body. When the sealing piston 7 has been forced into sealing contact with the valve disc 14, the through passage 17 of the valve disc communicates with the inner annular groove 18 formed in the sealing face of the sealing piston 7. When the through passage 17 registers with the inlet $X_1$, the feedback signal appearing at $X_1$ will be transmitted through the through passage 17, the inner annular groove 18, the passage 19 formed in the sealing piston 7 and communicating with the groove 18, and a line 20 to a start-stop valve 21 and if said valve is in position "start" the feedback signal will be transmitted in a line 22 to a stepping cylinder 23 to actuate the piston 24 associated with the cylinder 23. The actuated piston 24 acts on the piston rod 25 to move the stepping pawl 27 into the next indentation 28 between teeth of the ratchet wheel 29 whereas the spring 26 is prestressed. During this cocking movement the finger 30 carried by the piston rod 25 engages a beveled surface 31 of a lever 32 so that the latter is pivotally moved about the pivot 33 and actuates the valve 4 in a closing sense to interrupt the supply of compressed air from the actuating fluid inlet 3. The sealing piston 7 is now pressure-relieved by means which will be described hereinafter and is pulled away from the valve disc 14 by a tension spring 78 (FIG. 2), which will be described hereinafter. A locking pawl 34 is pivoted on the pivot 35 and bears on the finger 30, which protrudes from the piston rod 25. As the latter is raised by the piston 24, the tension spring 36 causes the locking pawl 34 to be pivotally raised about its pivot 35 until a locking edge 37 of the locking pawl 34 snaps behind a nose 38 of the lever 32. This arrangement ensures that the supply of compressed air from the actuating fluid inlet 3 will be shut down until the sealing piston 7 has been pressure-relieved and, as a result, the stepping cylinder 23 has been pressure-relieved too so that the stepping piston 24 is returned to its initial position by the spring 26. This causes the stepping pawl 27 to rotate the ratched wheel 29 and the valve disc 14, which is connected to the ratchet 29 by the tubular coupling 40, through one step. As the stepping piston 24 returns to its initial position, the finger 30 releases the locking pawl 34 shortly before the piston 24 has reached its end position. When the locking edge 37 disengages the nose 38 of the lever 32, the latter is released so that the valve 4 opens and the arrangement is ready for the next cycle of operations. For instance, if each outlet port 12 were directly connected to the associated inlet port 16, without interconnected consumer, then the stepping valve would be continually stepped. Another finger 41 is carried by the piston rod 25 and cooperates with a pushbutton 42, by which the ratched wheel 29 can be manually controlled to perform a step.

The finger 41 is acted upon by a finger 43 for resetting the ratchet wheel 29 and the valve disc 14, which is connected to the ratchet wheel by the tubular coupling 40. This is effected by means of a cardiod cam 44, known per se, which is non-rotatably connected to the tubular coupling 40.

The resetting piston 45 is connected by a piston rod 46 to a resetting lever 47, which is pivotally movable about the pivot 48 to act on the cardioid cam 44 in a resetting sense. For a resetting operation, the lever arm 49 of the resetting lever 47 disengages the stepping pawl 27 from the ratchet wheel 29 so that the latter can rotate in a sense that is opposite to the stepping sense. The resetting cylinder 50 is connected by a separate line 51 to the resetting port 52. The line 5 is connected by a fitting 53 to a pressure indicator consisting of a cylinder 54 and a spring-loaded indicating piston 55, which will be extended if pressure is applied to the cylinder 54. Line 20 is also connected by a fitting 56 to another pressure indicator, which consists of a cylinder 57 and a spring-loaded indicating piston 58, which will be extended if pressure is applied to the cylinder 57. The two indicating pistons 55 and 58 are provided with different color codes.

Structural details will now be explained with reference to FIGS. 2 to 6. FIGS. 2 and 3 show a plastic valve body core 60 having a plurality of inlet passages 61 and outlet passages 62. Each inlet passage 61 terminates at one end in an enlarged inlet bore 63. Each outlet passage 62 terminates at one end in an enlarged outlet bore 64. The enlarged bores 63 and 64 are adapted to fit tubular plugs, as will be explained hereinafter. In the upper portion of the valve body core 60, the inlet and outlet passages 61 and 62 communicate with laterally open grooves 65, which communicate with the ports 16 and 12, respectively, which constitute the circular series of ports 13a and 13, respectively, shown in FIG. 1. The grooves 65 provided on opposite sides of the core 60 are provided at their free edges with protruding sealing ribs 66 and are sealed by means of sealing plates 67 and 68, which are disposed between clamping plates 69 and 70, which are actuated by means of screws 71 to force the sealing plates 69 and 70 against the core 60. The grooves 65 connected to the inlet passages 61 are disposed on that side of the core 60 which is opposite to the ports 12 and 16 and are connected to bores 72, which constitute the inlet ports 16 in FIG. 1. The grooves 65 connected to the outlet passages 62 are disposed on the same side of the valve body 60 as the ports 12 and 16 and are connected to bores 73, which constitute the outlet ports 12. The bores 72 and 73 extend through the sealing plate 68 and the clamping plate 70. Each bore 72 is formed with a sealing shoulder 74, which constitutes a valve seat, which is adapted to be sealed by a valve member 76 that is biased towards the valve seat by a compression spring 75. Each valve member 76 comprises a profiled stem 77, which defines air passages in the bore 72 and has such a length that the stem 77 will protrude from the bore 72 toward the valve disc 14 when the valve member 76 lies against the seat 74. As a result, the bore 72 will then be shut off and the axially movable valve disc 14 will be clear of the clamping plate 70. As soon as the valve 4 has been closed so that the application of pressure to the sealing piston 7 has been interrupted, the spring-loaded valve members 76 will move into engagement with the valve seats 74 and their stems 77 will move the valve disc 14 away from the clamping plate 70 so that the cylinder chamber 6 will be vented through the passage or passages 8, the annular groove 9, the through passage 11 and that outlet port 12 which registers with the through passage 11. As a result, the sealing piston 7 will be pressure-relieved and will be pulled by the tension spring 78 away from the valve disc 14. That tension spring is secured at one end to the sealing piston 7 and at the other end to a cylinder head 81, which together with the sealing piston defines the cylinder chamber 6. The movement of the sealing piston 7 under the action of the spring 78 is limited by an annular stop of the cylinder head 81 in a position in which the sealing piston 7 clears as the clamping plate 70 even when the valve members 76 lie against the valve seats 74. As a result, the passages 8 in the sealing piston 7 are substantially closed by said annular stop and the valve disc 14 is then clear of the sealing piston 7 as well as of the clamping plate 70 so that the frictional resistance to a rotation of the valve disc 14 is minimized. The valve disc 14 is adapted to be sealed against the clamping plate 70 by O rings 80 held in annular recesses formed in the clamping plate 70 around the ports 12 and 16.

The position of the valve disc 14 is indicated by indicia, which are provided on the periphery of the valve disc 14 and consist of numerals 1 to 12, which in the window 2 designate that of the outlet ports $A_1$ to $A_{12}$ which registers with the through passage 11 and that of the inlet ports $X_1$ to $X_{12}$ which registers with the through passage 11 and that of the inlet ports $X_1$ to $X_{12}$ which registers with the through passage 17 of the valve disc 14.

The valve disc 14 is rotated by the tubular coupling 40. The tubular coupling 40 consists of two parts, one of which is non-rotatably connected to the ratchet wheel 29 and the cardioid cam 44 and the other of which is non-rotatably connected to the valve disc 14. The valve disc 14 is axially movable between the positions shown in FIGS. 2 and 4. The two parts of the tubular coupling 40 are non-rotatably connected by interengaging coupling elements, which interengage and are non-rotatably connected to each other also in the position shown in FIG. 4. The entire assembly comprising the sealing piston 7 and the tubular coupling carrying the valve disc 14, the ratchet 29 and the cardiod cam 44 is mounted on a continuous axle 83, which ensures that said parts will be reliably centered and is secured at one end to the side wall 84.

The passages formed in the sealing piston 7 communicate with passages in the core 60 through lines 5 and 20. The line 5 is connected by a coupling 85 and a radial bore in the cylinder head 81 to the cylinder chamber 6, from which one or more bores 8 in the sealing piston 7 lead to the outer annular groove 9, which is formed in the sealing face of the sealing piston 7. That sealing face is adapted to be sealed against the adjacent end face of the valve disc 14 by an outer sealing ring 87 and an inner sealing ring 88 disposed on opposite sides of the annular groove 9. The line 20 is connected by a coupling 86 and an angled bore 89 in the sealing piston 7 to the inner annular groove 19 formed in the sealing face of the sealing piston 7. An outer and an inner sealing ring are disposed on opposite sides of the annular groove 19 and protrude from the sealing face of the sealing piston 7. The sealing piston 7 is formed in its periphery between the angled bore 65 and the side that is opposite to the sealing face with an annular groove 90, which contains a sealing ring 91 for sealing the cylinder chamber 6.

Figure 4:
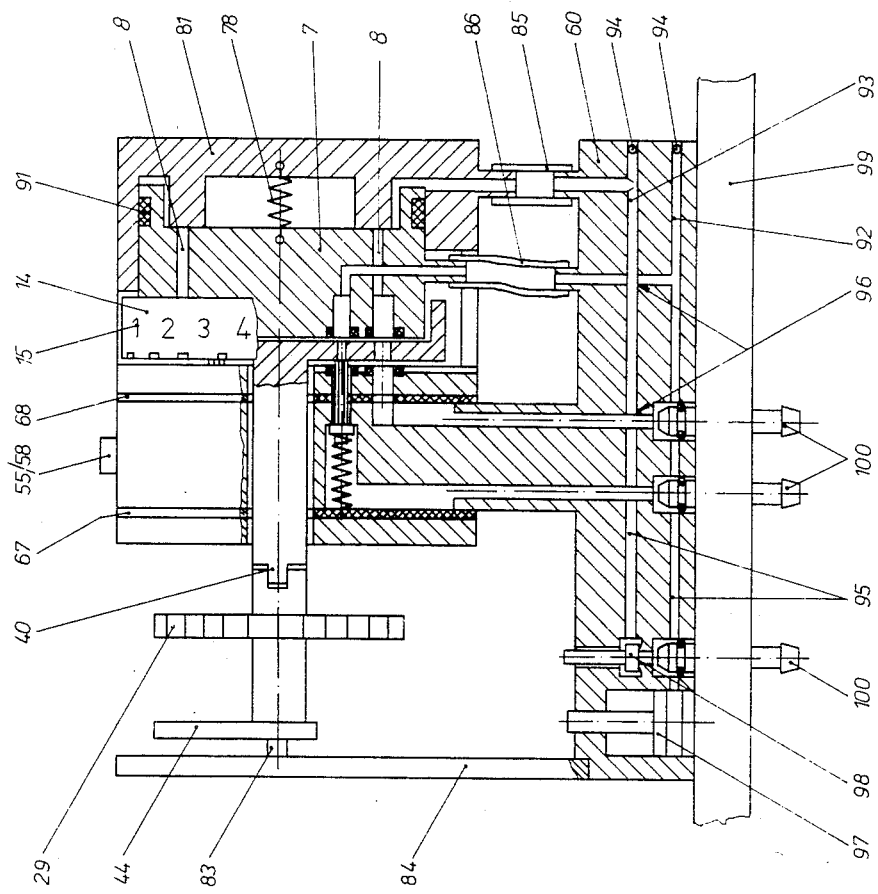
FIG. 4 is a sectional view showing the valve body, the valve disc, and lines connected to said components.

FIG. 4 shows further air passages consisting of angled bores 92 and 93, which are made in known manner as intersecting through bores, which are then sealed at one end each by a force-fitted ball 94. All said air passages are formed in the core 60 and extend in a plurality of planes 95 and cross each other at 96 and serve to connect a plurality of cylinders 97 and valves 98 corresponding to the cylinder 23 and the valve 4, respectively, in FIG. 1. In this manner, expensive conduits formed by external air hoses can be avoided and the length of the air flow paths required for the control of the valve is minimized. A plug carrier 99 carries movably mounted tubular plugs 100 permitting a quick replacement of the stepping valve whereas the external hoses need not be removed.

FIGS. 5 and 6 show the important parts of the lever mechanism and controls. A part of the core 60 is apparent with the resetting cylinder 50 and the piston 45 as well as the valve 4. The pushbutton 101 constitutes a selector switch and by means of a plurality of levers 102, 103 etc. controls the functions "setting up" and "operation". The operation of said levers is conventional and is not explained here in detail.

When the pushbutton 101 is in the illustrated position for setting up, the pushbutton 102 is enabled so that its actuation will have the result that the stepping mechanism consisting of the stepping pawl 27, the lever 103, which is integral with the throw-off preventer 104 is pivotally moved about its pivot 105 so that the ratchet wheel 29 is rotated through one step to a position in which the ratchet wheel 29 is retained by a spring 106 against a further stepping movement. In the other position, not shown, for operation, the stepping piston 24 acts on the lever 103 so that the pivot 105 is pivotally moved and the stepping pawl 27 pivoted at 107 is moved over the tooth 108 of the ratchet wheel 29. When the stepping cylinder 23 has subsequently been vented, the tension spring 110 secured to the throw-off preventer 104 and to the cover 109 causes the ratchet wheel to rotate through another step. Additional camming means and levers ae provided to effect coupling, interlock or other functions in order to eliminate the risk of damage in case of wrong control operations and to ensure that the operations will be performed in the correct sequence.

What is claimed is:
1. In a stepping valve comprising
a plurality of fluid outlets for delivering a pneumatic actuating fluid for performing respective operations,
a plurality of feedback inlets, each of which is associated with one of said fluid outlets and adapted to receive a pneumatic feedback signal indicating that the operation performed by actuating fluid from the associated fluid outlet has been completed, an actuating fluid inlet adapted to be connected to a source of pneumatic actuating fluid, a non-rotatable valve body having a port face formed with a first circular series of fluid inlet ports and with a second circular series of fluid outlet ports, said first and second circular series being concentric to each other, said fluid inlet and outlet ports communicating with respective ones of said feedback inlets and fluid outlets, each of said feedback inlet ports and one of said fluid outlet ports constituting a pair of ports, a rotatable valve member, which is concentric to said first and second series of fluid ports and formed with radially spaced apart first and second through passages, each of which opens on the side of said valve member facing said port face and on the opposite side of said rotary valve member, said rotatable valve member being rotatable to a plurality of angularly spaced apart positions in each of which said first and second through passages register and communicate with said feedback inlet port and said fluid outlet port of one of said pairs of fluid ports, drive means operable to rotate said rotary valve member in successive steps to successive ones of said angularly speed apart positions, drive control means for controlling the operation of said drive means in response to said feedback signals, said drive control means having a feedback signal inlet, and coupling means for coupling said feedback control inlet to said first through passage for connecting said actuating fluid inlet to said second through passage, the improvement residing in that said coupling means comprise a sealing piston, which is held against rotation and disposed on said opposite side of said rotatable valve member and has a sealing face facing said opposite side of said rotatable valve member, said sealing piston being axially movable into and out of sealing engagement between said sealing end face and said opposite side of said rotatable valve member, said sealing piston having first piston passage means communicating with said feedback signal inlet and second piston passage means communicating with said actuating fluid inlet, said first and second piston passage means being arranged to communicate with said first and second through passages, respectively, when said sealing end face of said piston is in sealing engagement with said rotatable valve member on said opposite side thereof and said rotatable valve member is in any of said angularly spaced apart positions, spring means are provided, which urge said sealing piston away from said rotatable valve member, signal-generating means are provided for generating a step completion signal in response to the completion of each of said steps, pressure-applying means are provided for applying pneumatic pressure from said actuating fluid inlet to said sealing piston in response to each of said step completion signals to force said sealing piston toward said rotatable valve member against the action of said spring means, and pressure-relieving means are provided for pressure-relieving said piston in response to each of said feedback signals.

2. The improvement set forth in claim 1, wherein said valve disc is formed on the side facing said valve body with a plurality of venting grooves, which are open at the periphery of said rotatable valve member and register with respective ones of said fluid outlet ports except the one which is adjacent to said second through passage.

3. The improvement set forth in claim 2, wherein said valve disc is formed on the side facing said valve body with a plurality of additional venting grooves, which are open at the periphery of said rotatable valve member and register with respective ones of said fluid inlet ports except the one which is adjacent to said first through passage.

4. The improvement set forth in claim 1, wherein
said rotatable valve member comprises a disc, which is provided on its periphery with indicia associated with respective ones of said angularly spaced apart positions of said disc and a window is provided which exposes that of said indicia which is associated with the present position of said disc.

5. The improvement set forth in claim 4, wherein
said pressure-applying means comprise cylinder structure defining a cylinder chamber with said sealing piston on the side thereof which is opposite to said sealing face, a pressure-applying line connecting said actuating fluid inlet to said cylinder chamber, and a shut-down valve, which is incorporated in said pressure-applying line and arranged to open in response to each of said step completion signals and to close in response to each of said feedback signals, said coupling means comprise a feedback line connecting said first piston passage means to said feedback control inlet, and said pressure-applying line and said feedback line are provided each with a cylinder-piston device having a piston rod which is visible from the outside and arranged to be extended in response to pressure in the associated line.

6. The improvement set forth in claim 1, wherein
said valve body comprises a core, which is formed on one side with a plurality of grooves communicating with respective ones of said feedback inlets and with respective ones of said fluid inlet ports, and is formed on the opposite side with a plurality of grooves communicating with respective ones of said fluid outlets and with respective ones of said fluid outlet ports, a sealing plate covering said grooves is provided on each side of said core, a clamping plate is provided in contact with each of said sealing plate on the side thereof which is opposite to said core, means are provided which force said clamping plates against said core and said clamping plate provided on that side of said core which faces said valve disc is formed with said fluid outlet ports and said fluid inlet ports.

7. The improvement set forth in claim 6, wherein
each of said grooves is provided at its edges with sealing ribs contacting the adjacent sealing plate and is formed with venting grooves at the outer edges thereof.

8. The improvement set forth in claim 6, wherein each of said fluid ports is surrounded by a sealing ring carried by said clamping plate formed with said ports and protrudes toward said valve disc and is formed with venting grooves.

9. The improvement set forth in claim 7, wherein each of said through passages is surrounded by a sealing ring carried by said valve disc on the side thereof facing said valve body and is formed with venting grooves.

10. The improvement set forth in claim 1, wherein
said pressure-applying means comprise a cylinder structure defining a cylinder chamber with said sealing piston on the side thereof which is opposite to said sealing face, and means defining passage means connecting said cylinder chamber to said actuating fluid inlet,
said first and second piston passage means comprise concentric first and second annular grooves, which are formed in said sealing face and register with said first and second through passages, respectively, a passage formed in said sealing piston and connecting said first annular groove with said cylinder chamber, and an angled passage formed in said sealing piston and connected to said second annular groove and opening on the periphery of said sealing piston,
means are provided which connect said angled passage to said feedback signal inlet, and
said sealing face is provided with a first pair of sealing rings, which are concentric to and disposed radially inwardly and outwardly, respectively, of said first annular groove, and with a second pair of sealing rings, which are concentric to and disposed radially inwardly and outwardly, respectively, of said second annular groove.

11. The improvement set forth in claim 10, wherein
said second circular series of fluid ports surrounds said first circular series of fluid ports and
said second annular groove surrounds said first annular groove.

12. The improvement set forth in claim 10, wherein said cylinder structure comprises a cylinder head formed with stiffening ribs.

13. The improvement set forth in claim 1, wherein
said valve body comprises a plastic core formed with angled passages communicating with said fluid ports,
said sealing piston consists of plastic and is formed with an angled passage,
each of said angled passages consist of two through passages which intersect each other, and
each of said intersecting passages is sealed at one end by a ball which is force-fitted in said passage at said one end.

14. The improvement set forth in claim 1, wherein
said rotatable valve member comprises an axially movable valve disc formed with said first and second through passages,
stop means are provided, which are engageable by said sealing piston to limit its movement away from said valve disc, and
said pressure-relieving means comprise means for interrupting the application of pressure by said pressure-applying means and spring-loaded means for axially moving said valve disc away from said valve body to a position in which said valve disc is clear of said valve body and said sealing piston when the latter engages said stop means.

15. The improvement set forth in claim 14, wherein
said valve body is formed with a plurality of stem-containing bores, each of which is axially aligned and communicates with one of said fluid ports of one of said circular series of fluid ports,
said spring-loaded means comprise a plurality of stems, each of which extends in one of said stem-containing bores and is axially movable therein and defines air passages in said stem-containing bore and the associated fluid port and is axially movable to protrude from said fluid port to said valve disc, and spring means urging said stems toward said valve disc to disengage said valve disc from said valve body when said application of pressure to said sealing piston has been interrupted.

16. The improvement set forth in claim 15, wherein said stem-containing bores communicate with said fluid inlet ports.

17. The improvement set forth in claim 16, wherein
each of said stem-containing bores is formed with an annular valve seat facing away from said valve disc and
each of said stems carries a valve member, which is adapted to be urged into sealing engagement with said valve seat by said spring means.

18. The improvement set forth in claim 15, wherein each of said stems is formed with longitudinal ribs in sliding engagement with said stem-containing bore.

19. The improvement set forth in claim 1, wherein
said valve body is T-shaped and provided with supply and discharge lines and
mechanism comprising levers and pawls are provided for stepping said rotatable valve member, performing and interlocking operations of said valve in response to manual and remote control so as to ensure the performance of operations of said valve in a desired sequence.

20. The improvement set forth in claim 1, wherein
said drive means comprise a ratchet wheel non-rotatably connected to said rotatable valve member, a stepping pawl operable to rotate said ratchet wheel through one step in response to a tensile force exerted on said stepping pawl, a piston rod carrying said stepping pawl and tension spring means acting on said piston rod to exert said tensile force on said stepping pawl and
said drive control means comprise a pneumatic cylinder-piston unit provided with said feedback control inlet and adapted to operate said piston rod so as to disengage said stepping pawl from said ratchet wheel opposite to the force of said tension spring means in response to each of said feedback signals.

21. The improvement set forth in claim 20, wherein resetting means are provided for rotating said rotatable valve member to a predetermined angular position, said resetting means comprising
a cardiod cam, which is non-rotatably connected to said ratchet wheel, and
a resetting pneumatic cylinder-piston unit, which is arbitrarily operable to disengage said stepping pawl from said ratchet wheel and to rotate said cardiod cam to a predetermined angular position.

22. The improvement set forth in claim 1, wherein each of said fluid outlets and feedback inlets and said actuating fluid inlet is formed with an enlarged bore for receiving a tubular plug provided with a hose coupling and with means for securing said plug to a carrier.

* * * * *